(12) United States Patent
Dempsey

(10) Patent No.: US 6,505,797 B1
(45) Date of Patent: Jan. 14, 2003

(54) COLLAPSIBLE LAPTOP STAND

(76) Inventor: Samuel D. Dempsey, 1237 NE. 16 Ter., Ft. Lauderdale, FL (US) 33304

( * ) Notice: Subject to any disclaimer, the term of this patent is extended or adjusted under 35 U.S.C. 154(b) by 0 days.

(21) Appl. No.: 10/016,932

(22) Filed: Dec. 14, 2001

(51) Int. Cl.[7] .............................................. F16M 11/38
(52) U.S. Cl. ..................... 248/166; 248/176.1; 248/917
(58) Field of Search .................. 248/439, 460, 248/434, 461, 176.1, 447.2, 455, 456, 463, 917, 676, 166; 108/44, 152; 224/930; 211/40

(56) References Cited

U.S. PATENT DOCUMENTS

| | | | | |
|---|---|---|---|---|
| 1,247,033 A | * | 11/1917 | Swartz | 211/50 |
| 3,562,796 A | * | 2/1971 | Jacobson | 248/456 |
| 4,116,413 A | * | 9/1978 | Andersen | 248/451 |
| 5,035,393 A | * | 7/1991 | Menaged | 248/456 |
| 5,141,196 A | * | 8/1992 | Arnold et al. | 248/126 |
| 5,177,665 A | * | 1/1993 | Frank et al. | 108/44 |
| 5,810,299 A | * | 9/1998 | Poulos | 211/195 |
| 5,899,421 A | * | 5/1999 | Silverman | 248/175 |
| 5,915,661 A | * | 6/1999 | Silverman et al. | 248/454 |
| 6,148,738 A | * | 11/2000 | Richter | 108/44 |
| 6,341,704 B1 | * | 1/2002 | Michel, Jr. | 211/119 |

* cited by examiner

Primary Examiner—Korie Chan
(74) Attorney, Agent, or Firm—J. Sanchelima; A. Bordas

(57) ABSTRACT

A laptop computer stand adapted to be mounted on a chair or similar vertical structure that includes a horizontal edge. A hanging frame assembly includes a pivotally mounted arched arm at one end that receives the edge of a chair in one extreme position and is retractable within the hanging frame assembly in the other extreme position. The hanging frame assembly is pivotally mounted to the base frame assembly that receives the hanging frame assembly therein is one extreme position and at a substantially rectangular relationship with the hanging frame assembly in the other extreme position. A pivotally mounted leg member is used to raise the base frame assembly to a predetermined angle in one extreme position, and as a spacer in another position while the other extreme position the leg member is housed with the hanging frame space. A retainer member pivotally mounted flange is mounted to the distal end of the base frame assembly to serve as a stopper for a laptop to prevent it from sliding down.

5 Claims, 3 Drawing Sheets

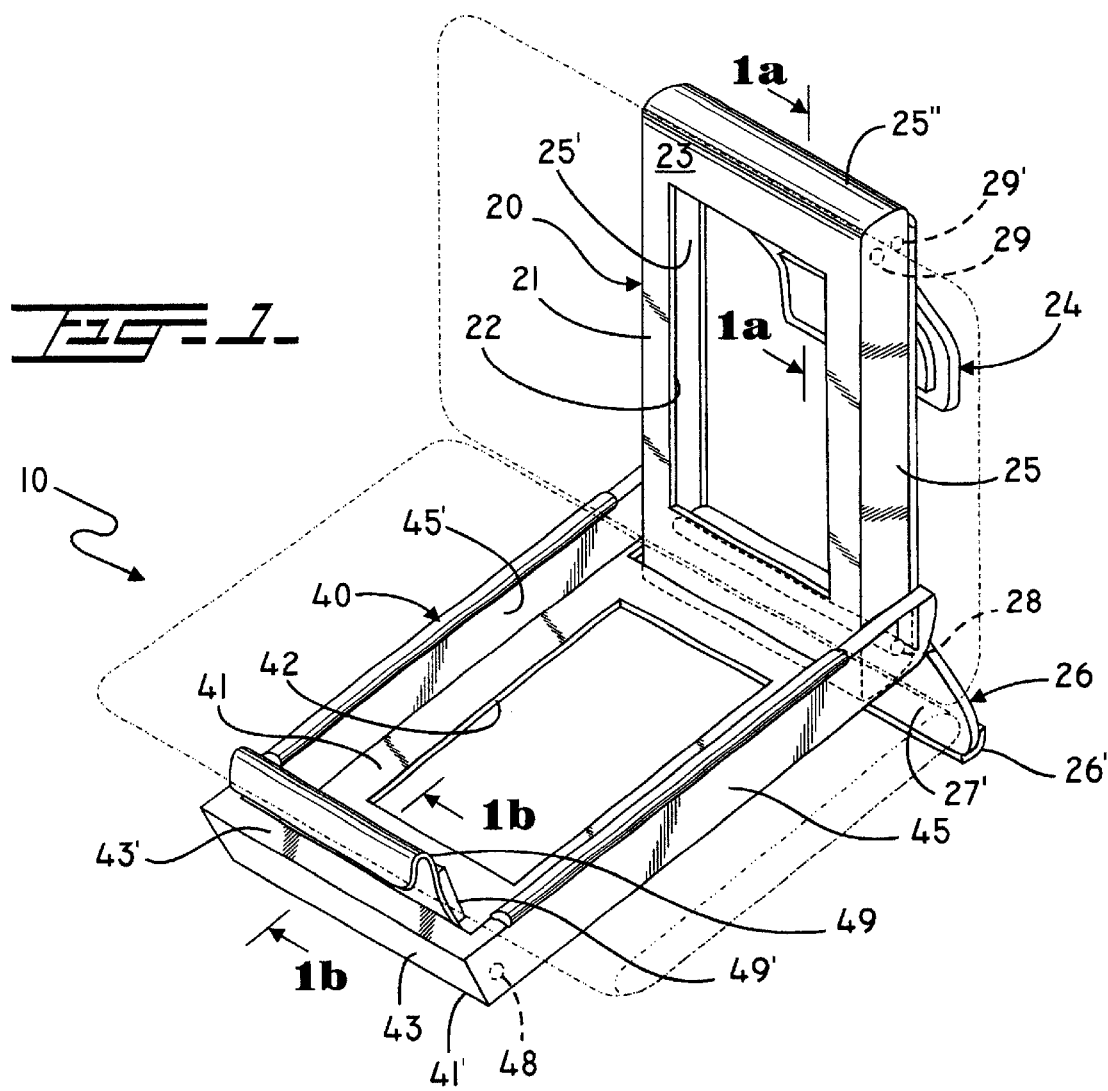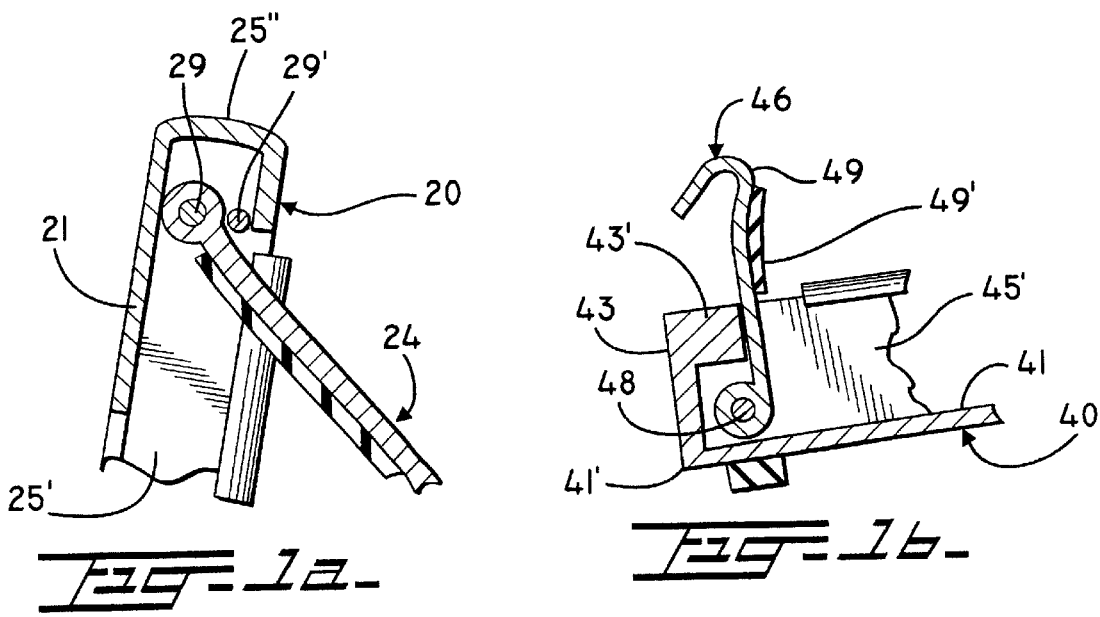

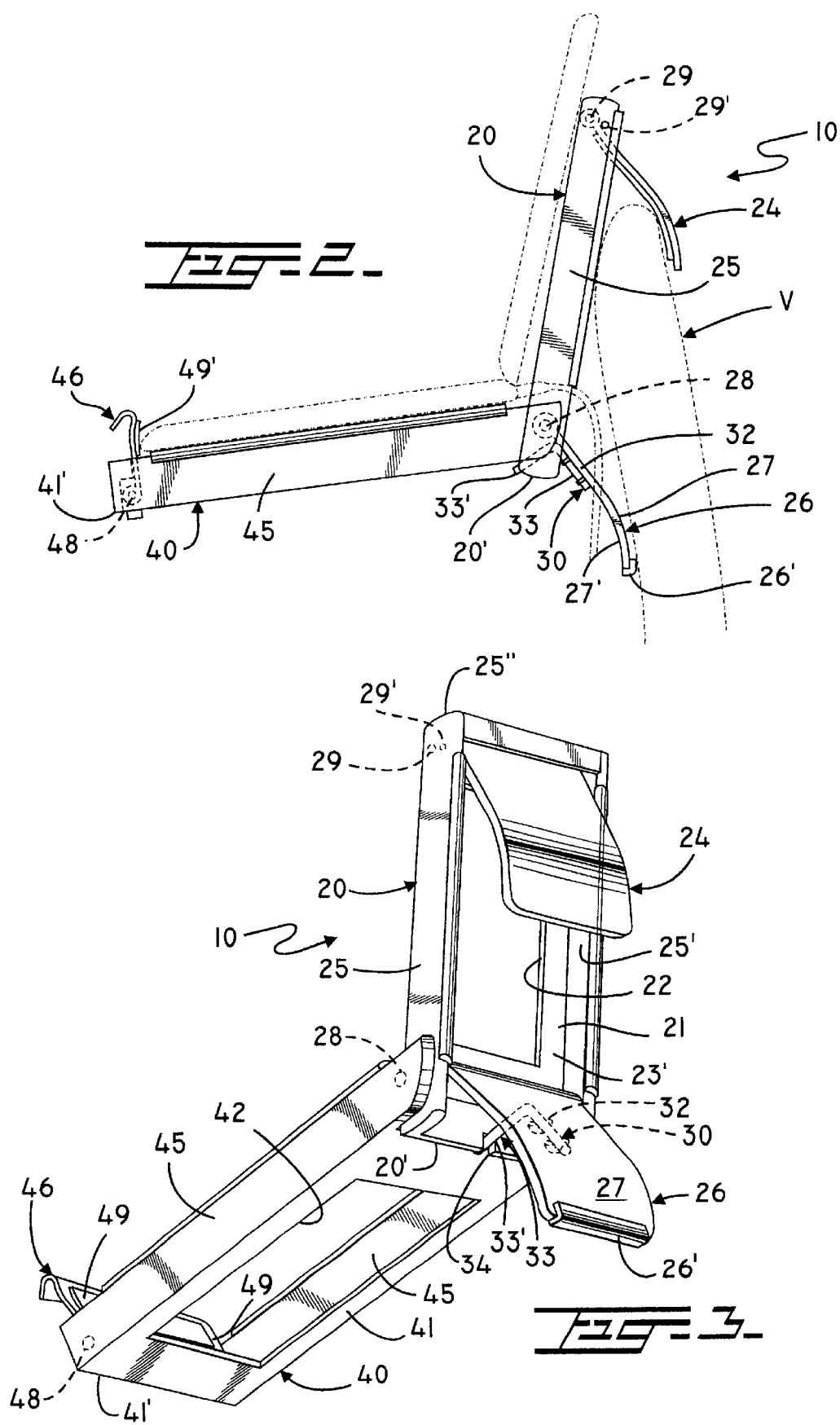

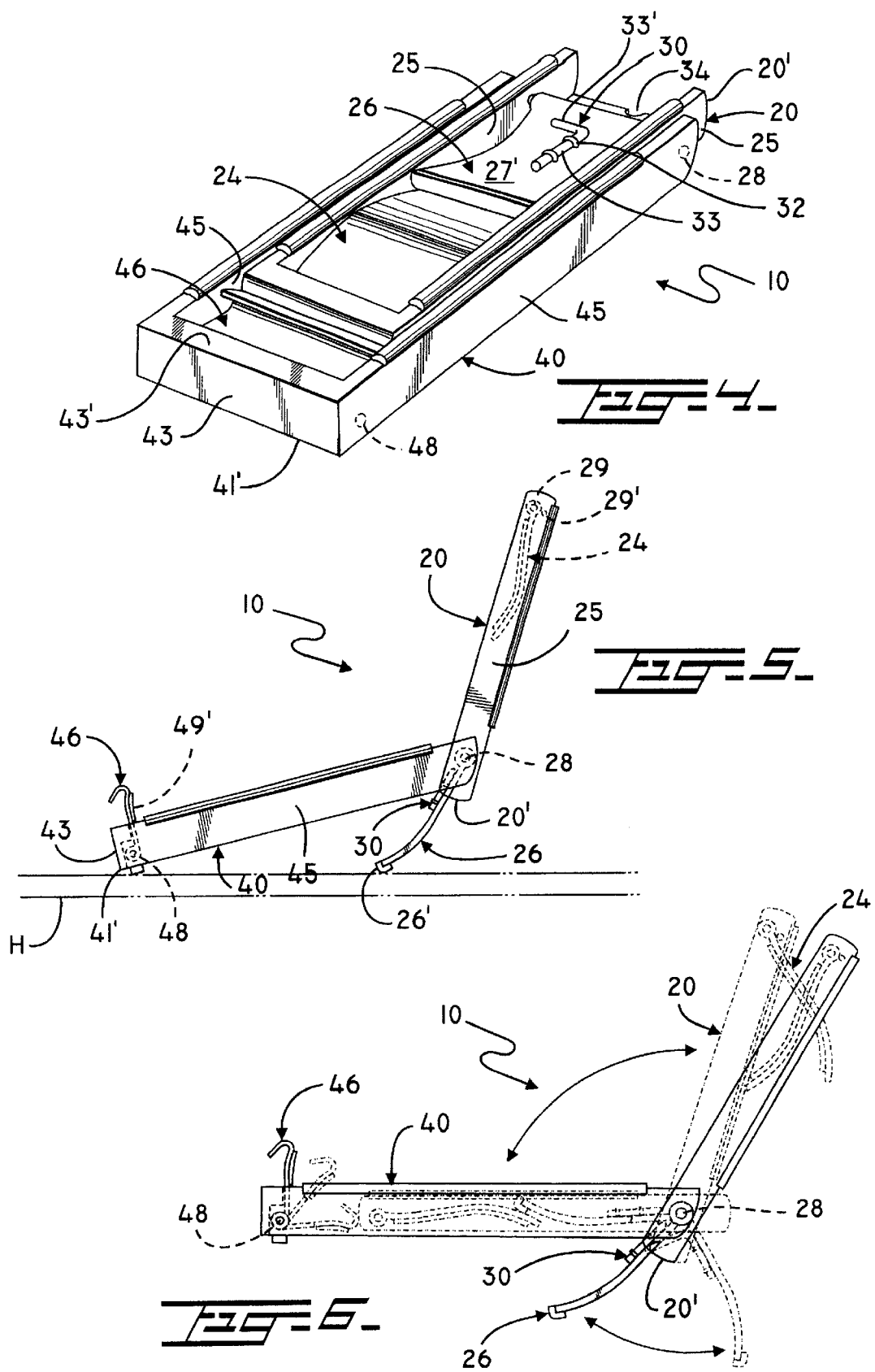

COLLAPSIBLE LAPTOP STAND

BACKGROUND OF THE INVENTION

1. Field of the Invention

The present invention relates to collapsible laptop computer stand and more particularly, to a laptop stand that may be used in any substantially vertical structure or set on a horizontal surface.

2. Description of the Related Art

Many designs for laptop computer stands have been designed in the past. None of them, however, provide for a collapsible structure that is volumetrically efficient for transportation and storage purposes.

Applicant believes that the closest reference corresponds to U.S. Pat. No. 6,148,738 issued to Herbert Richter on Nov. 21, 2000 for a steering wheel mountable laptop table. The patented table includes spaced hooks forming a support structure for supporting the base body on the steering wheel, a table is pivotally mounted on the base body and the height is adjustable. However, it differs from the present invention because Richter's patented invention is not collapsible, occupies substantial space and it is awkward to transport. The present invention also provides more stability and more versatility by being suitable for use with vertical and horizontal surfaces.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a collapsible laptop stand that can be mounted on substantially vertical structure, such as the backs of chairs.

It is another object of this invention to provide a collapsible laptop stand that permits a user to removably position on a laptop at convenient positions.

It is still another object of the present invention to provide a collapsible laptop stand that is volumetrically efficient.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of one of the preferred embodiments for the collapsible laptop stand object of the present invention with an laptop computer shown in phantom.

FIG. 1a is a cross sectional view taken along line 1a—1a in FIG. 1, showing the detail of pivoting arm stopped by inner point.

FIG. 1b is a cross sectional view taken along line 1b—1b in FIG. 1, showing the retainer member stopped by the edge of the transversal structural member.

FIG. 2 shows a side elevational view of the embodiment represented in FIG. 1 with an open laptop computer and mounted to the back of a seat.

FIG. 3 is an isometric view illustrating the back and bottom of the embodiment represented in figure one, showing some features of the invention.

FIG. 4 an isometric view of the invention when it is in the closed position.

FIG. 5 is a side elevational view of the invention resting over a horizontal surface. Laptop computer is shown in phantom.

FIG. 6 is a side elevational view of the invention when it is in the closed position and other positions are shown in phantom.

DETAILED DESCRIPTION OF THE PREFERRED EMBODIMENT

Referring now to the drawings, where the present invention is generally referred to with numeral 10, it can be observed that it basically includes hanging frame assembly 20 and base frame assembly 40 selectively positioned between two extreme positions. Stand 10 can be used with a vertical structure (as shown in FIG. 1) or on a horizontal surface (as shown in FIG. 5).

As seen in FIG. 1, hanging frame assembly 20 includes inwardly extending flat frame 21 with a central through opening 22. Frame 21 has inner surface 23 and outer surface 23', as seen in FIGS. 1 and 3. Member 25 and 25' are mounted to the lateral edges of frame 21, at a parallel and spaced apart relationship with respect to each other. Spacer member 25" joins the two distal ends of members 25 and 25'. A space or cavity is defined between members 25; 25' and 25". Pivoting arm 24 has an arched shape adapted to accept the edge of a vertical structure V, such as the back of a chair. This arched shape is selected to accept most available horizontal edges to users, such as the back of an airline seat. Pivoting arm 24 is pivotally mounted to the distal ends of elongated structural members 25 and 25' adjacent and parallel to member 25" through which hinge pin 29 passes. As best seen in FIG. 1a, stopper pin 29' is adjacent and parallel to spacer member 25". Pin 29' limits the movement of arm 24 to a convenient angle to accept the edge of a vertical structure V.

The other end 20' of hanging frame assembly 20 includes hinge pin 28 through members 25 and 25' and elongated structural members 45 and 45'. Pivoting leg member 26 extends slightly arched to provide a cooperative position for frame assembly 40 of stand 10. Surface 27 coacts with vertical structure V where stand 10 is mounted, as best seen in FIG. 2.

Flat frame 21 has notch 34 at end 20'. Notch 34 is equidistant from a elongated structural members 25 and 25'. Locking assembly 30 includes L-shape locking pin 32. Leg 33 of pin 32 is rotatably mounted against surface 27' and a leg 33' swings freely 180 degrees. L-shape locking pin 32 of locking assembly 30 is selectively placed perpendicularly with respect to surface 27' to cooperatively lockingly engage with notch 34. This causes leg 26 to stay at a predetermined angle with respect to the plane of flat frame 21.

Base frame assembly 40 includes a substantially flat frame 41 with a central through opening 42. Elongated structural members 45 and 45' are mounted to the lateral edges of flat frame 41, at a parallel and spaced apart relationship with respect to each other. Base frame assembly 40 also includes structural member 43 transversally mounted between the two distal ends of members 45 and 45' defining end 41'. Retainer member 46 is pivotally mounted to structural members 45 and 45' adjacent to member 43. Hinge pin 48 is mounted between members 45 and 45' and is journaled by member 46. Transversal structural member 43 includes flange 43' that acts as a stopper to keep retainer member 46 in a substantially perpendicular relationship with respect to flat frame 41, as represented in FIG. 1b. Retainer member 46 has cushion pad 49' transversally attached to its external wall 49 to coacts with laptop computer (in phantom) keeping it in place. Pads, or other non-sliding material, cover the upper edges of elongated structural members 45 and 45' to prevent laptop computer from sliding. Members 45; 45' and 43 define a sufficiently large space or cavity to selectively receive hanging frame assembly 20 therein.

Laptop stand 10 can also be mounted over a horizontal flat surface H such as a table. Pivoting leg member 26 serves as a supporting leg when laptop is in the position shown in FIG. 5. To cooperatively position stand 10 over surface H, a user rotates pivoting leg member 26 to the extreme position where it coacts with end 41' of flat frame 41. The distal end of pivoting leg member 26 is covered with pad 26' to prevent stand 10 from sliding.

Laptop stand 10 is collapsible and therefore volumetrically efficient for transportation and storage purposes. As represented in FIGS. 4 and 6, stand 10 is collapsed to a closed position by turning pivoting arm 24 and leg member 26 to the extreme inwardly position within the space defined by elongated structural members 25 and 25'. Retainer member 46 is also rotated and positioned inward base frame assembly 40 within the space defined by elongated structural members 45 and 45'. Finally, hanging frame assembly 20 is rotated and inserted into the space defined by elongated structural members 45 and 45'.

Optionally, hanging frame assembly 20 and base frame assembly 40 can be telescopically adjusted to provide a better adaptability of stand 10 to laptops of different dimensions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A laptop computer stand, comprising:
   A) a base frame assembly having first and second ends and coextending first and second elongated members kept at a spaced apart parallel relationship with respect to each other by first and second transversal members, so that an elongated first space is formed;
   B) a hanging frame assembly having third and fourth ends and coextensive third and fourth elongated members kept at a spaced apart parallel relationship with respect to each other by third and fourth transversal members defining a plane, so that an elongated second space is defined therein, and said hanging frame assembly having cooperative dimensions to be selectively housed within said first space;
   C) means for selectively positioning said base frame assembly with respect to said hanging assembly at a substantially perpendicular relationship with respect to each other in one extreme position and within each other at the other extreme position;
   D) a supporting leg member pivotally mounted to said third end so that said base assembly is selectively positioned at a predetermined angle when resting over a horizontal surface and housed within said second space in another position; and
   E) an arm member pivotally mounted to said fourth end and being movable between two extreme positions, one of said extreme positions being housed within said second space and the other extreme position extending at a predetermined angle with respect to said plane of said hanging frame assembly so that a substantially horizontal edge of a vertical structure can be removably housed therein.

2. The stand set forth in claim 1, further including:
   a retainer member pivotally mounted to said second end and selectively moved between two extreme positions, one of said extreme positions being substantially perpendicular to said base frame assembly and the other extreme position having said retainer member housed within said first space.

3. The stand set forth in claim 2 wherein said arm member is arched to cooperatively receive horizontal edges of a predetermined range different thickness.

4. The stand set forth in claim 3, wherein said leg member is arched to complement the shape of said arm member to avoid interference therewith when both are housed within said second space thereby avoiding protrusion above said second space.

5. The stand set forth in claim 5, further including:
   G) means for locking said leg member in an intermediate position that extends a predetermined distance from said hanging frame assembly thereby providing spaced apart support to said hanging frame.

* * * * *